(12) United States Patent
Matsui et al.

(10) Patent No.: US 8,767,324 B2
(45) Date of Patent: Jul. 1, 2014

(54) COLOR FILTER SUBSTRATE, DISPLAY DEVICE, AND EXPOSURE METHOD

(75) Inventors: Kohei Matsui, Tokyo (JP); Ryosuke Yasui, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 13/516,078

(22) PCT Filed: Dec. 10, 2010

(86) PCT No.: PCT/JP2010/007191
§ 371 (c)(1),
(2), (4) Date: Jun. 14, 2012

(87) PCT Pub. No.: WO2011/074216
PCT Pub. Date: Jun. 23, 2011

(65) Prior Publication Data
US 2012/0293884 A1    Nov. 22, 2012

(30) Foreign Application Priority Data
Dec. 16, 2009    (JP) ................................. 2009-285213

(51) Int. Cl.
*G02B 5/22*    (2006.01)
*G02F 1/1335*    (2006.01)

(52) U.S. Cl.
CPC ......... *G02F 1/133516* (2013.01); *Y10S 359/90* (2013.01)
USPC ............................. 359/885; 359/891; 359/900

(58) Field of Classification Search
None
See application file for complete search history.

(56) References Cited

U.S. PATENT DOCUMENTS 7,342,636 B2 *  3/2008  Lee et al. ...................... 349/156
2011/0070532 A1  3/2011  Ikeda et al.

FOREIGN PATENT DOCUMENTS

| JP | 08-045823 | 2/1996 |
| JP | 2001-124922 | 5/2001 |
| JP | 2001-133619 | 5/2001 |
| JP | 2003-050387 | 2/2003 |
| JP | 2006-58336 | 3/2006 |
| JP | 2006-292955 | 10/2006 |
| JP | 2007-265853 | 10/2007 |
| JP | 2009-244301 | 10/2009 |
| WO | WO 2009/145032 | 12/2009 |

OTHER PUBLICATIONS

International Search Report of Corresponding PCT Application PCT/JP2010/007191 mailed Mar. 15, 2011.
Japanese Office Action issued on Nov. 14, 2013 in corresponding Japanese Patent Application No. 2009-285213.

* cited by examiner

*Primary Examiner* — Jade R Chwasz (57)    ABSTRACT

A color filter substrate is provided that allows the realization of a liquid crystal display device having excellent display quality and generating no noticeable display unevenness. On a color filter substrate, a lattice-shaped black matrix is formed, and a plurality of colored pixels are formed in matrix. The maximum value of the differences between the overlap widths Wa (or Wb) in the row direction between first colored layers and the black matrix in an area exposed through a photomask, and the overlap widths Wg (or Wh) in the row direction between second colored layers and the black matrix in an area exposed through another photomask, is 4 μm or less. Further, the maximum value of overlap widths Wa to Wl in the row direction between all of the colored pixels and the black matrix is 8 μm or less.

8 Claims, 11 Drawing Sheets

COLOR FILTER SUBSTRATE, DISPLAY DEVICE, AND EXPOSURE METHOD

CROSS REFERENCE TO RELATED APPLICATIONS

This application is a national phase application, under 35 U.S.C. 371, of international application No. PCT/JP2009/007191, filed on Dec. 10, 2010, which claimed priority to Japanese Patent Application No. 2009-285213, filed on Dec. 16, 2009, the disclosures of which are incorporated herein by reference.

TECHNICAL FIELD

The present invention relates to color filter substrates used in liquid crystal display devices, organic EL display devices, and the like.

BACKGROUND ART

With recent increase in the size of liquid crystal display devices, the size of color filters used in liquid crystal display devices has also increased. In a process of manufacturing color filters, patterning is performed by photolithography to form colored layers. However, there is a problem that the cost of manufacturing color filters is increased due to the very high price of large photomasks. Therefore, various kinds of new exposure methods using small masks have been studied.

CITATION LIST

Patent Literature

[PTL 1] Japanese Laid-Open Patent Publication No. 2006-292955

SUMMARY OF THE INVENTION

Problems to be Solved by the Invention

One example of the exposure methods using small masks is a method (hereinafter, referred to as "small mask continuous exposure method") in which the entire surface of a to-be-exposed substrate is repeatedly exposed while the substrate is being transported, by using an exposure device in which photomasks smaller than display pixel areas of the color-filter substrate are mounted to exposure heads.

Figure 13:
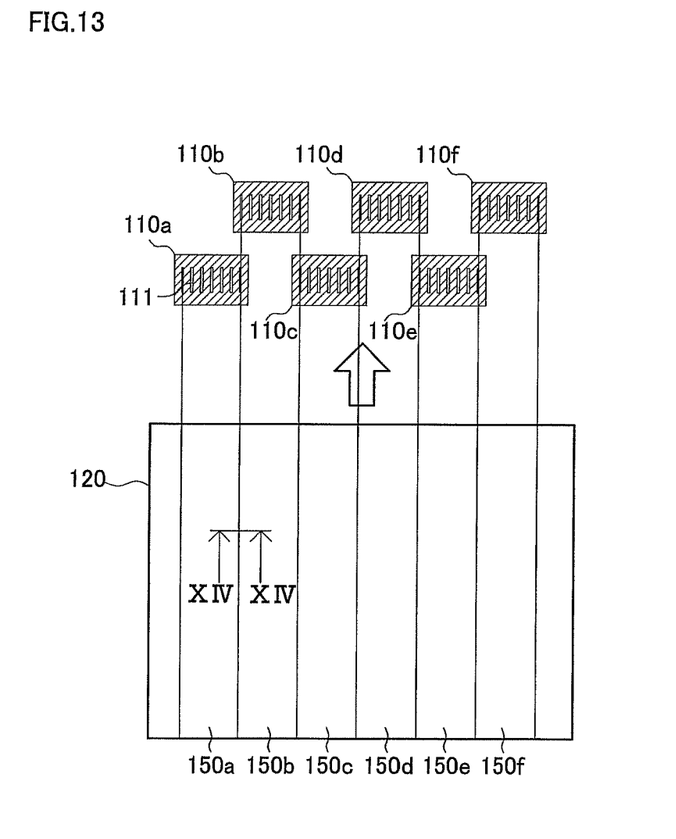
FIG. 13 illustrates a small mask continuous exposure method for exposing substrates.
Figure 14:
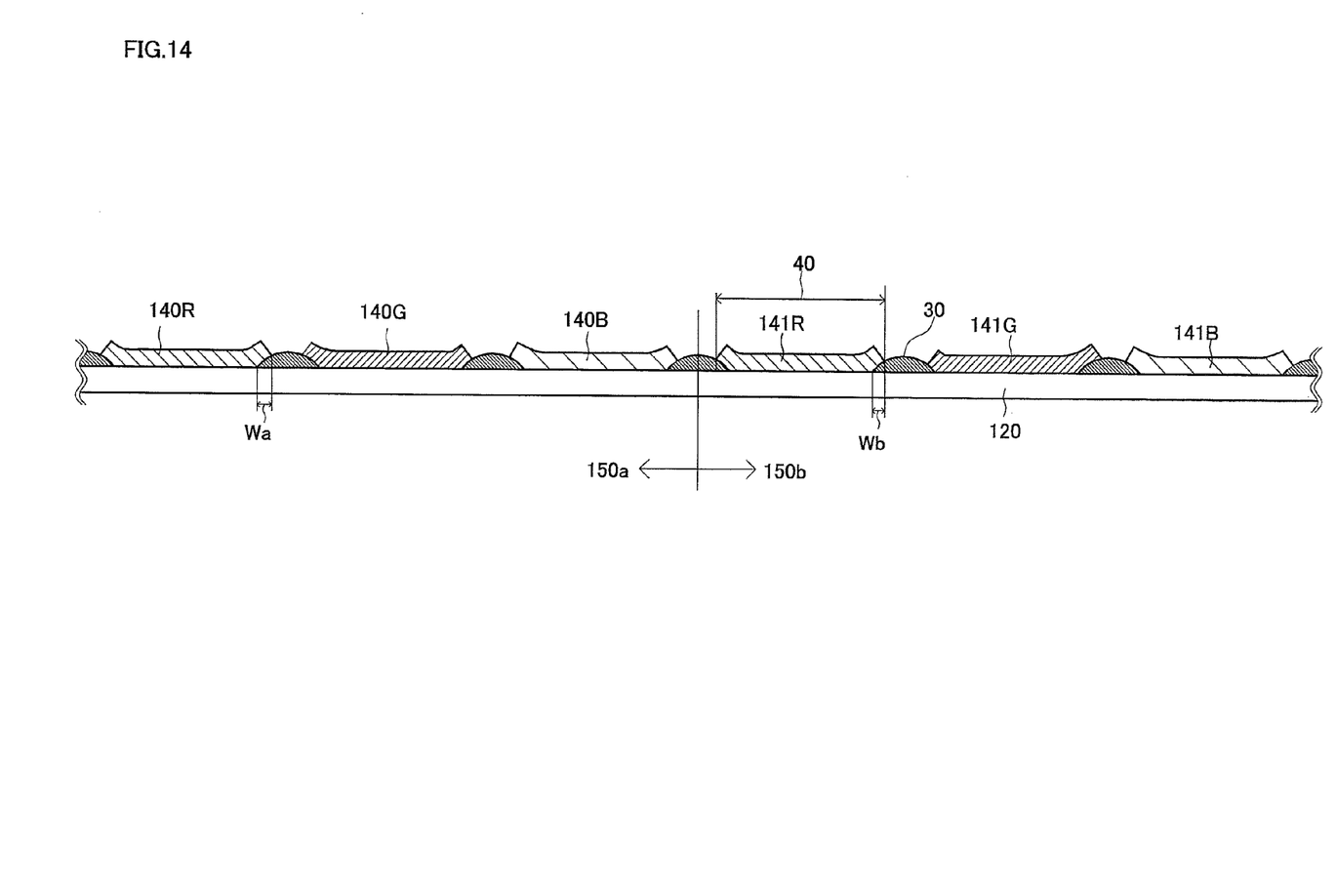
FIG. 14 is a cross-sectional view of a color filter substrate along a XIV-XIV line in FIG. 13.

FIG. 13 illustrates a small mask continuous exposure method for exposing substrates, and FIG. 14 is a view showing a cross-section of an exposed color filter substrate along a XIV-XIV line in FIG. 13.

Photomasks 110a to 110f are mounted to a plurality of exposure heads, respectively, and are arranged in two separate rows aligned in a direction perpendicular to a direction in which a substrate is transported (a direction indicated by an arrow in the figure). To be specific, each photomask in one row is located at a position corresponding to a space between a pair of adjacent photomasks in the other row. Openings 111 formed in each of the photomasks 110a to 110f are aligned in the leftward/rightward direction of the figure at predetermined pitches. The photomasks 110a to 110f arranged in this manner are used to expose resists on areas 150a to 150f which border one another on a substrate 120.

As shown in FIG. 14, on the substrate 120 having been exposed by the above exposure process, a lattice-shaped black matrix 30 is formed, and colored layers 140 and 141 are formed in areas defined by the black matrix 30. In order to prevent generation of white patches, the colored layers 140 and 141 included in colored pixels are formed in such a manner as to partially overlap the black matrix 30.

Here, if the openings 111 of the photomasks 110 used in the exposure for the colored layers 140 are formed at regular pitches, the amounts of misalignment between the colored layers 140 of the same color and the black matrix 30 are constant in the area 150a. Therefore, variation in overlap widths between the colored layers 140 and the black matrix 30 does not occur. The same is true for each of the areas 150b to 150f.

However, the overlap widths between the colored layers 140 of the same color and the black matrix 30 may vary among different areas. Specifically, overlap widths Wa between colored layers 140R and the black matrix 30 in the area 150a may be greatly different from overlap widths Wb between colored layers 141R and the black matrix 130 in the area 150b, due to difference in exposure illuminance between the exposure heads, deviation of an optical axis relative to the substrate 120, misalignment of patterns of the photomasks, misalignment between the photomasks and the substrate 120, and the like. Such difference in the overlap widths between the black matrix 130 and the colored layers 140 and 141 affects the orientation of a liquid crystal enclosed between the color filter substrate and a counter substrate, resulting in a problem that display unevenness is visually recognized between the different areas when a liquid crystal display device is built.

In view of the above, an object of the present invention is to provide a color filter substrate that allows the realization of a liquid crystal display device having excellent display quality and generating no noticeable display unevenness.

Solutions to the Problems

The present invention relates to a color filter. The color filter includes a substrate, a lattice-shaped black matrix formed on the substrate, and a plurality of colored pixels arranged on the substrate in a row direction and a column direction perpendicular to the row direction. Colored pixels of the same color are aligned in the column direction of the color filter. Each of the colored pixels includes a colored layer overlapping with an area defined by the black matrix and with a portion of the black matrix around the area. In a first area that includes a plurality of consecutive columns of colored pixels, the amounts of misalignment in the row direction between colored layers of the same color and the black matrix are constant. In a second area that includes a plurality of consecutive columns of colored pixels and does not overlap with the first area, the amounts of misalignment in the row direction between colored layers of the same color and the black matrix are constant. The maximum value of differences between overlap widths in the row direction between colored pixels of the same color and the black matrix in the first area, and overlap widths in the row direction between colored pixels of the same color and the black matrix in the second area, is not greater than 4 μm. The maximum value of overlap widths in the row direction between all of the colored pixels and the black matrix is not greater than 8 μm.

Advantageous Effects of the Invention

According to the present invention, even if a plurality of photomasks are used to perform exposure, a display device

DESCRIPTION OF EMBODIMENTS

A color filter substrate according to the present invention is produced by an exposure method (small mask continuous exposure method) in which exposure process is repeatedly performed a plurality of times while a substrate is being continuously transported, by using a plurality of photomasks smaller than areas to be exposed. The color filter substrate is characterized in that variation in overlap widths between colored layers and a black matrix among areas exposed through the different photomasks is reduced. Exposure methods and structures of color filter substrates according to different embodiments will be described in order below.

First Embodiment

Figure 1:
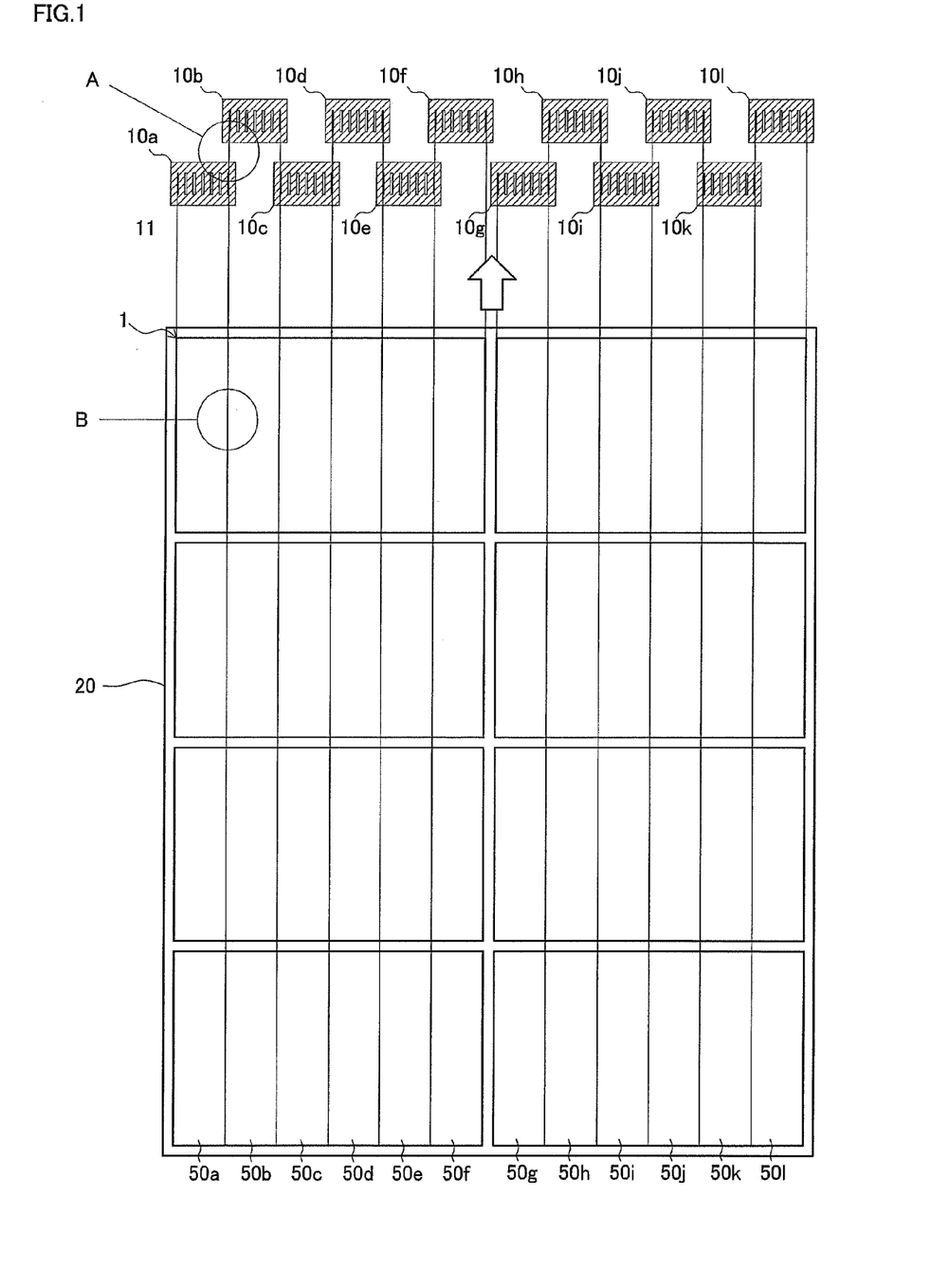
FIG. 1 illustrates an exposure method for a color filter substrate according to a first embodiment of the present invention.
Figure 2:
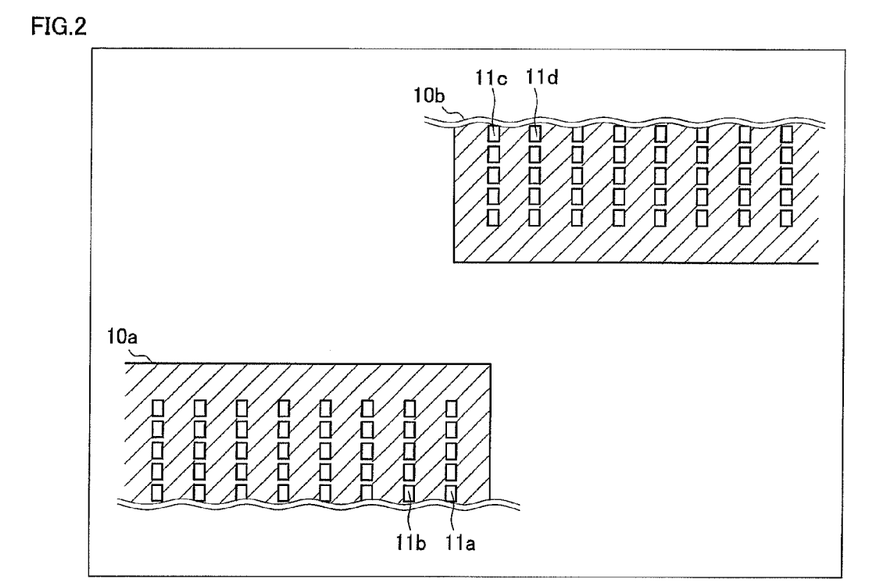
FIG. 2 is an enlarged view of a portion A in FIG. 1.

FIG. 1 illustrates an exposure method for a color filter substrate according to a first embodiment, and FIG. 2 is an enlarged view of a portion A in FIG. 1.

In the present embodiment, as shown in FIG. 1, patterning is performed for a resist on a substrate 20 by using twelve photomasks 10a to 10l arranged in two separate rows. To be more specific, the photomasks 10a, 10c, 10e, 10g, 10i, and 10k are arranged at predetermined intervals in the first row (on the side from which the substrate 20 is brought in), and the photomasks 10b, 10d, 10f, 10h, 10j, and 10l are arranged in the second row so as to compensate for the spaces between the photomasks in the first row. In the present embodiment, as shown in FIG. 2, the photomask 10a in the first row and the photomask 10b in the second row are arranged such that an outermost column of openings 11a and an outermost column of openings 11c are used to form one and the other, respectively, of two adjacent columns of colored layers on the substrate 20.

In the present embodiment, as shown in FIG. 2, a plurality of openings are provided in matrix at regular intervals in the photomasks 10a and 10b. Also in the other photomasks 10c to 10l, a plurality of openings are formed at regular intervals in the row direction and in the column direction. These photomasks 10a to 10l constitute a photomask set for performing exposure to form colored pixels of the same color. The openings formed in each photomask may not necessarily be dot-shaped as shown in FIG. 2, and may be slits aligned in the row direction. In the case where slits are adopted as the openings, the slits may be provided at regular intervals.

To produce a color filter substrate, first, a lattice-shaped black matrix (area that extends in the row and column directions in a strip-like manner in FIG. 3 described below) is formed on the substrate 20. The method for forming the black matrix is not particularly limited, and various methods can be used.

Next, the substrate 20 to which a resist has been applied is transported by a transportation device (not shown) in the arrow direction in the figure toward the plurality of photomasks 10a to 10l which are arranged so as to be opposed to a light source (not shown). The light source is caused to intermittently emit light while the substrate 20 is being transported in the arrow direction in the figure, and areas of the substrate 20 which face the openings 11 are exposed a plurality of times. In this manner, pattering is sequentially performed to form colored pixels of the same color in the substrate transportation direction.

Subsequently, another resist for a different color is applied to the substrate 20, and then continuous exposure is performed in the same manner as described above while the substrate 20 is being transported continuously. Thus, colored pixels are formed on the substrate 20 for all colors (e.g., RGB, RGBY).

Figure 3:
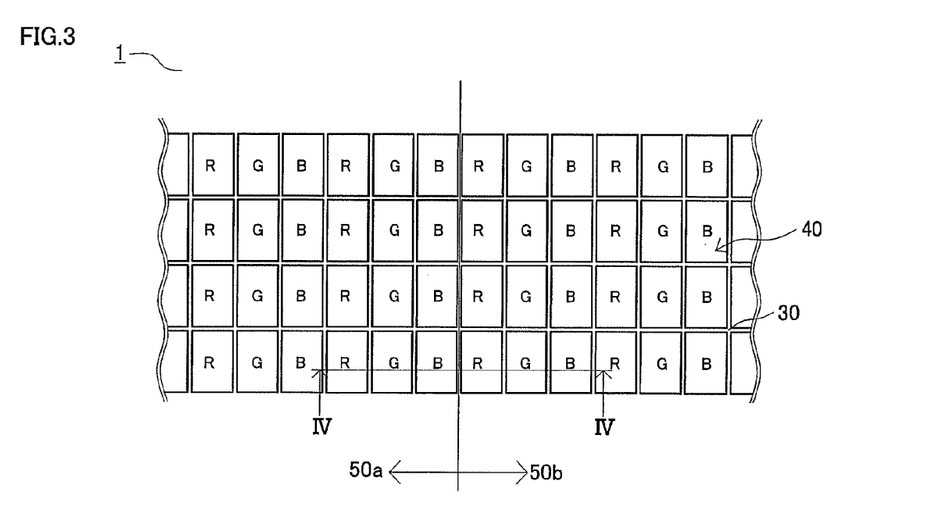
FIG. 3 is an enlarged view of a portion B in FIG. 1 of the color filter substrate according to the first embodiment of the present invention.
Figure 4:
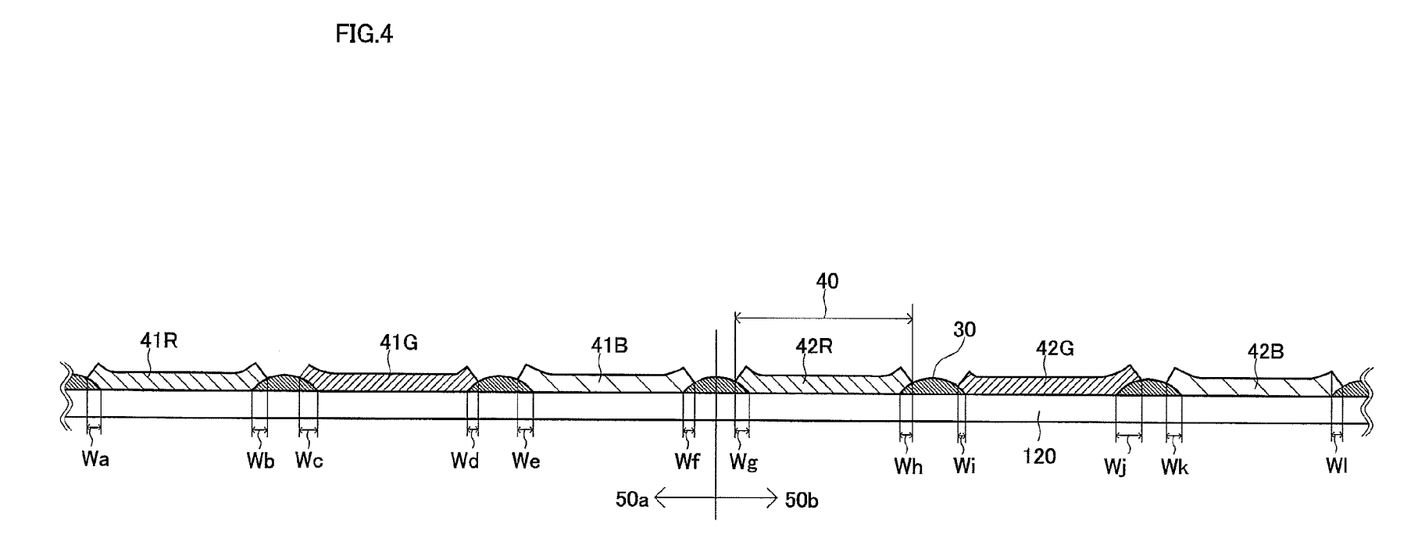
FIG. 4 is a cross-sectional view along a IV-IV line in FIG. 3.

FIG. 3 is an enlarged view of a B portion in FIG. 1 of the color filter substrate according to the first embodiment of the present invention. FIG. 4 is a cross-sectional view along a IV-IV line in FIG. 3.

As shown in FIG. 3, on a color filter substrate 1 produced through the above steps, a plurality of colored pixels 40 of red, green, and blue (RGB) are formed in the row direction (the direction perpendicular to the substrate transportation direction) and in the column direction (substrate transportation direction) perpendicular to the row direction. Here, each of the colored pixels 40 includes a colored layer 41 (or a colored layer 42) that overlaps with an area defined by a lattice-shaped black matrix 30 and with a portion of the black matrix 30 around the area. For example, the color filter substrate 1 is designed to have such dimensions that the widths of the colored layers 41 and 42 in the row direction (the leftward/rightward direction in FIG. 4) are 50 µm or more, their thicknesses are between 1 and 3 µm, the width of the black matrix 30 in the row direction (the leftward/rightward direction in FIG. 4) is 6 µm or more, and its thickness is between 1 and 2 µm. In addition, an overcoat (not shown) with a thickness less than 3 µm may be formed, as necessary, so as to cover the colored layers 41 and 42, and the black matrix 30.

Referring again to FIG. 1, the exposed area of the color filter substrate 1 on which the colored pixels 40 have been formed by exposure can be divided into a plurality of areas depending on through which photomask the area has been exposed. Specifically, the exposed area of the substrate 20 can be divided into a plurality of areas 50a to 50l which have been exposed through the photomasks 10a to 10l, respectively. In the present embodiment, since the photomasks are arranged as shown in FIG. 2, the areas 50a to 50l are adjacent to one another in the direction (the row direction) perpendicular to the substrate transportation direction.

As described above, if the pitch between the openings 11 is constant in each of the photomasks 10a to 10l, the amounts of misalignment of colored pixels of the same color relative to the black matrix (the amounts of misalignment of the colored layers in the row direction relative to the black matrix) are constant within each of the areas 50a to 50l. On the other hand, among the different areas, the amounts of misalignment of colored pixels of the same color relative to the black matrix may vary due to misalignment of the exposure heads, variation in the conditions for exposure, and the like.

According to the present invention, however, it has been found that unevenness of color among areas having been exposed through different photomasks can be made less noticeable if the overlaps between the colored pixels 40 and the black matrix 30 are set so as to satisfy the conditions described below.

Referring to FIG. 4, first of all, the amounts of misalignment in the row direction between colored layers 41R of one color (e.g., red) and the black matrix 30 are constant in the area 50a exposed through the photomask 10a. Therefore, overlap widths Wa and Wb in the row direction between the colored layers 41R and the black matrix 30 are each constant in the area 50a. Similarly, the amounts of misalignment in the row direction between green colored layers 41G and the black matrix 30 are constant, and the amounts of misalignment in the row direction between blue colored layers 41B and the black matrix 30 are constant. Therefore, overlap widths Wc and Wd in the row direction between the colored layers 41G and the black matrix 30 are constant, and overlap widths We and Wf in the row direction between the colored layers 41B and the black matrix 30 are constant.

Secondly, also in the area 50b exposed through the photomask 10b and adjacent to the area 50a without overlapping, the amounts of misalignment in the row direction between colored layers 42R of one color (e.g., red) and the black matrix 30 are constant. Therefore, overlap widths Wg and Wh in the row direction between the colored layers 42R and the black matrix 30 are each constant in the area 50b. Similarly, the amounts of misalignment in the row direction between green colored layers 42G and the black matrix 30 are constant, and the amounts of misalignment in the row direction between blue colored layers 42B and the black matrix 30 are constant. Therefore, overlap widths Wi and Wj in the row direction between the colored layers 42G and the black matrix 30 are constant, and overlap widths Wk and Wl in the row direction between the colored layers 42B and the black matrix 30 are constant.

In addition to the above conditions, the following conditions are satisfied. For the colored pixels of one color (e.g., red), the overlap widths Wa (or Wb) between the colored layers 41R and the black matrix 30 in the area 50a, and the overlap widths Wg (or Wh) between the colored layers 42R and the black matrix 30 in the area 50b are set such that the maximum value of the differences between the overlap widths Wa (or Wb) and the overlap widths Wg (or Wh) is 4 µm or less. Also for the green colored pixels and blue colored pixels, the maximum values of the differences between the overlap widths between the colored layers and the black matrix 30 in the area 50a, and the overlap widths between the colored layers and the black matrix 30 in the area 50b (the maximum value of the differences between the overlap widths Wc or Wd and the overlap widths Wi or Wj, and the maximum value of the differences between the overlap widths We or Wf and the overlap widths Wk or Wl) are 4 µm or less.

Further, in the entire area of the color filter substrate 1, the maximum value of the overlap widths Wa to Wl in the row direction between the colored layers and the black matrix 30 is 8 µm or less.

The relationship between the two areas 50a and 50b has been described above. However, it should be noted that, in the color filter substrate according to the present embodiment, the same relationship exists between any two areas selected from the areas 50a to 50l having been exposed through the different photomasks.

In order to obtain the color filter substrate 1 that satisfies the above conditions, an exposure method according to the present invention includes at least one of the following processes (a) to (d).

(a) Process of adjusting the exposure illuminances of an exposure head to which the photomask 10a is mounted, and an exposure head to which the photomask 10b is mounted, such that the difference between the exposure illuminances is 1% or less.

(b) Process of adjusting the tilt of the photomask 10a or 10b such that the difference between an exposure gap between the photomask 10a and the substrate, and an exposure gap between the photomask 10b and the substrate, is 10 µm or less.

(c) Process of offsetting the position exposed through the photomask 10a or 10b to adjust the positions on the substrate at which the colored pixels are formed such that the difference in the amounts of misalignment of the colored layers relative to the black matrix 30 is 1 µm or less. (If a position exposed through a photomask is offset for a substrate that is first introduced to an exposure device such that the difference in the amounts of misalignment of colored layers relative to a black matrix is 1 µm or less, even when the positions at which other substrates are subsequently introduced vary due to mechanical causes, the maximum value of the differences in the overlap widths between the colored layers and the black matrix among adjacent areas can be set to be 4 µm or less in each substrate.)

(d) Process of designing the color filter substrate 1 such that the overlap widths between the black matrix 30 and the colored layers are 5 µm or less.

The color filter substrate 1, which is produced so as to satisfy the above conditions, is used as a color filter for a liquid crystal display device or an organic EL display device. The liquid crystal display device primarily includes the color filter substrate 1, a counter substrate having a TFT array, a liquid crystal enclosed in a space (set to be 4 µm or more) between the color filter substrate 1 and the counter substrate, and a backlight which emits light from the TFT array side. The organic EL display device primarily includes the color filter substrate 1 and an organic EL panel including an organic EL element.

When a display device is built using the color filter substrate 1 according to the present embodiment, since the overlaps between the colored layers and the black matrix 30 are adjusted as described above, unevenness of color among different areas is reduced. If the maximum value of the differences in overlap width among different areas is larger than 4 µm, variation in the orientation of liquid crystal molecules, which is due to increase in the amount of overlap of the colored layers with the black matrix 30, becomes remarkable among different areas. As a result, local display unevenness is recognized on the pixel areas. In addition, if the maximum value of the overlap widths is greater than 8 µm, since the amount of overlap of the colored layers with the black matrix 30 is great, even a slight difference in overlap width affects the orientation of the liquid crystal. In this case, even if the maximum value of the differences in overlap width is 4 µm or less, display unevenness among different areas occurs.

(Modification of First Embodiment)

Figure 5:
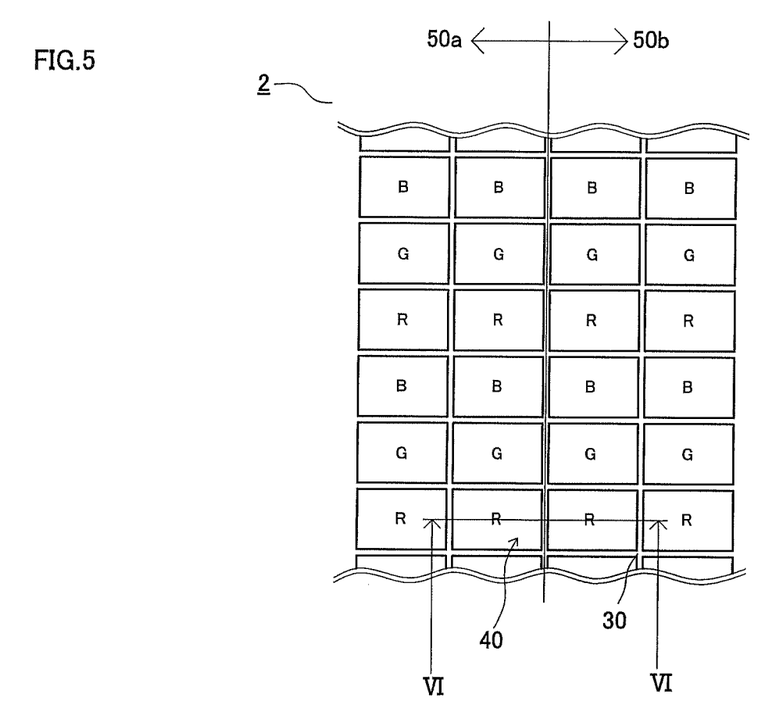
FIG. 5 is a plan view of a color filter substrate according to a modification of the first embodiment.
Figure 6:
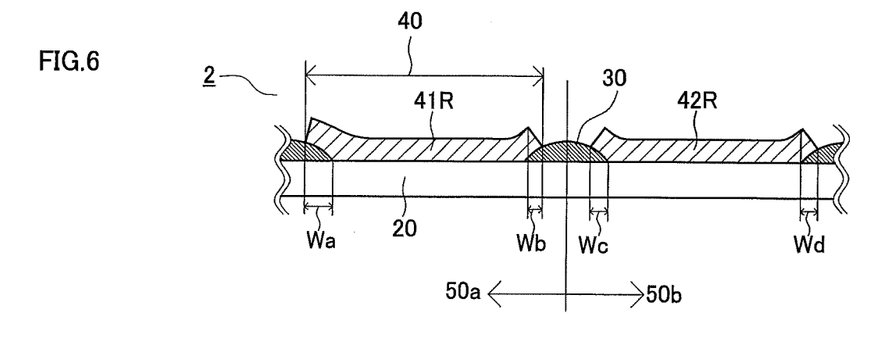
FIG. 6 is a cross-sectional view along a VI-VI line in FIG. 5

FIG. 5 is a plan view of a color filter substrate according to a modification of the first embodiment, and FIG. 6 is a cross-sectional view along a VI-VI line in FIG. 5.

A color filter substrate 2 is different from the color filter substrate 1 shown in FIG. 3 in that colored layers of the same color are aligned in the row direction (the leftward/rightward direction in FIG. 5). The color filter substrate 2 is produced by repeatedly performing exposure a plurality of times while transporting a substrate in the arrow direction in the figure toward photomasks arranged in the same manner as in FIG. 1 (it should be noted that the shape and arrangement of the openings are different from those in the photomasks in FIG. 1).

As shown in FIG. 5, in the color filter substrate 2, the colored pixels 40 of the same color are formed continuously from the area 50a to the area 50b which are adjacent to each other. As shown in FIG. 6, in the color filter substrate 2, the overlap widths Wa (or Wb) in the row direction between the colored layers 41R and the black matrix 30 in the area 50a, and the overlap widths Wc (or Wd) in the row direction between the colored layers 42R and the black matrix 30 in the area 50b, are set such that the maximum value of the differences between the overlap widths Wa (or Wb) and the overlap widths Wc (or Wd) is 4 µm or less. The same conditions are satisfied for the blue and green colored pixels. In addition, the maximum value of the overlap widths Wa to Wd is 8 µm or less. Also in a liquid crystal display device using the color filter substrate 2, occurrence of display unevenness among different areas can be effectively prevented.

Second Embodiment

As compared to the color filter substrate 1 according to the first embodiment, a color filter substrate according to a second embodiment is different in terms of the structure of areas exposed through photomasks. The same components as those in the first embodiment are denoted by the same reference characters, and the description thereof is omitted.

Figure 7:
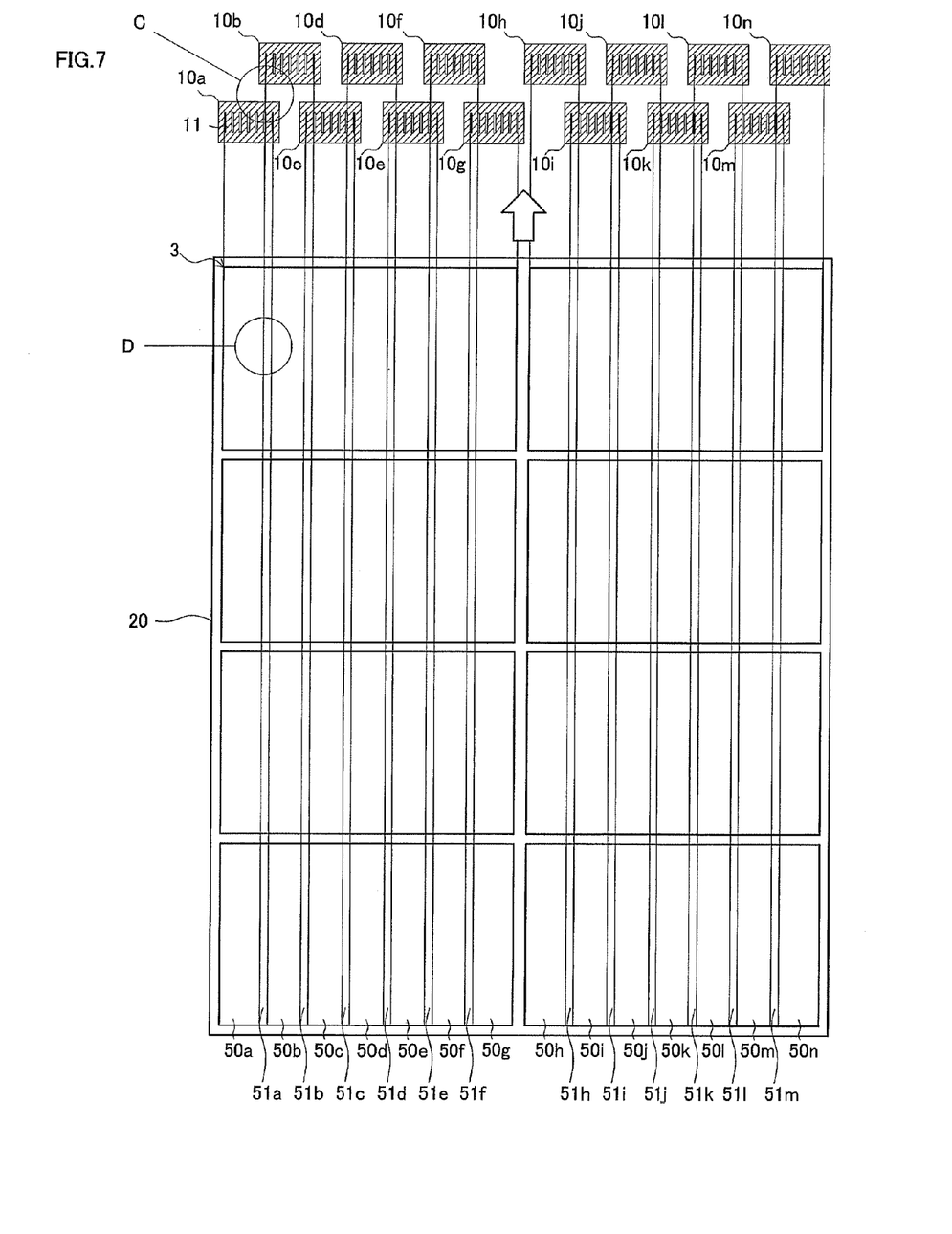
FIG. 7 illustrates an exposure method for a color filter substrate according to a second embodiment of the present invention.
Figure 8:
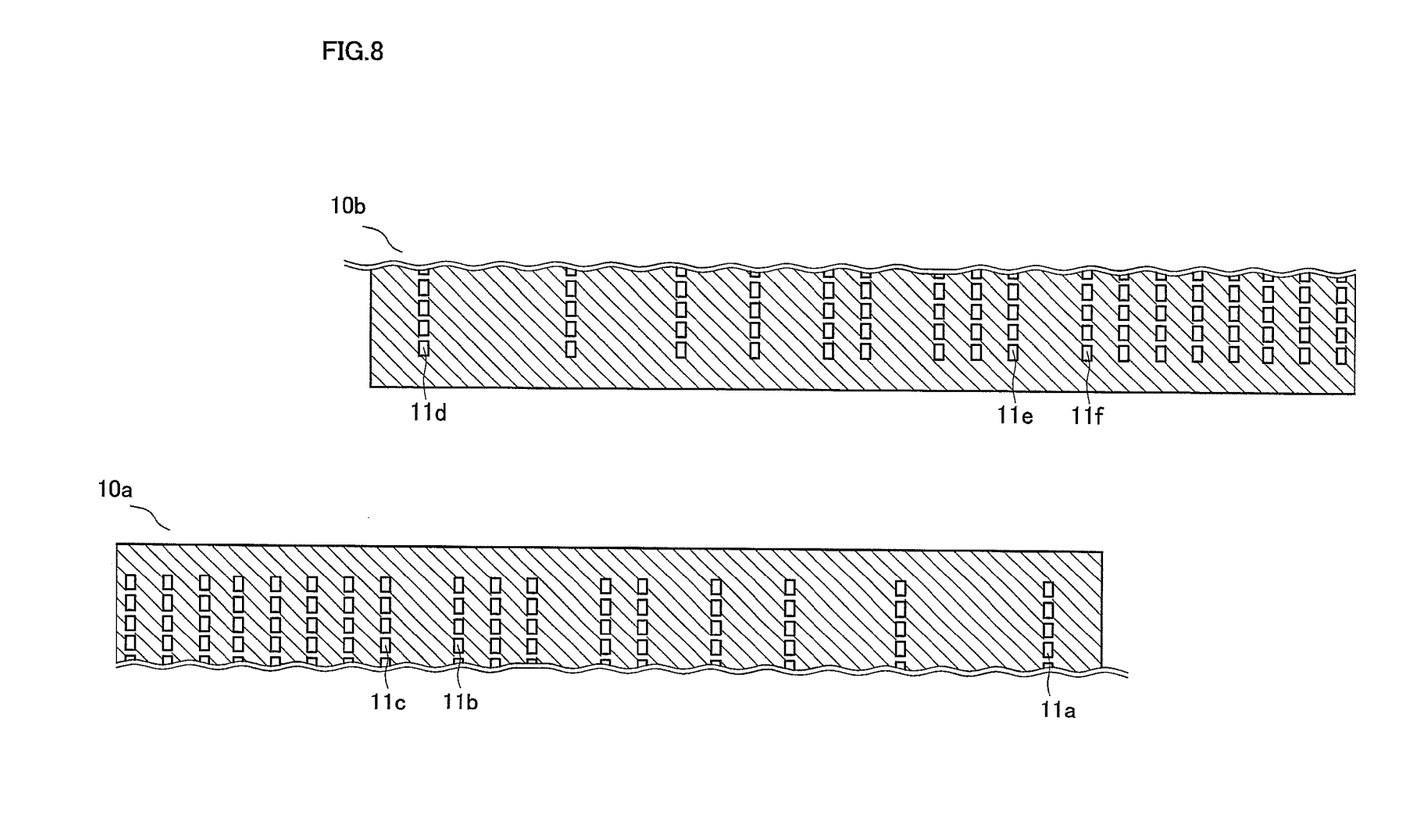
FIG. 8 is an enlarged view of a portion C in FIG. 7.

FIG. 7 illustrates an exposure method for a color filter substrate according to the second embodiment of the present invention, and FIG. 8 is an enlarged view of a C portion in FIG. 7.

Areas 50a to 50n of a color filter substrate 3 are exposed through photomasks 10a to 10n. In addition, the photomasks in the first row and the photomasks in the second row are arranged so as to overlap each other. Areas 51a to 51f, and areas 51h to 51m, are exposed through the overlapping portions.

As shown in FIG. 8, the photomasks 10a and 10b, through which the areas 50a, 50b, and 51a are exposed, are formed and arranged such that the arrangement of openings 11 provided in the photomask 10a and the arrangement of openings 11 provided in the photomask 10b complement each other to form colored pixels. To be specific, each of the photomasks 10a and 10b includes a portion in which columns of the openings are provided at regular intervals, and a portion in which columns of the openings are provided at irregular intervals. When the photomasks 10a and 10b are caused to partially overlap each other, some of the columns of the openings (the portion in which the interval between the columns is not constant) of the photomask 10a, and some of the columns of the openings (the portion in which the interval between the columns is not constant) of the photomask 10b, are located complementarily. For example, openings 11a of the photomask 10a are located between openings 11e and 11f of the photomask 10b, and openings 11d of the photomask 10b are located between openings 11b and 11c of the photomask 10a.

The other photomasks 10c to 10n are also formed in the same manner. Thus, some of the columns of the openings in one photomask, and some of the columns of the openings in another photomask adjacent to the one photomask, are provided at irregular intervals so as to be complementary to each other. These photomasks 10a to 10n constitute a photomask set for performing exposure to form colored pixels of the same color. The openings formed in each photomask may not necessarily be dot-shaped as shown in FIG. 2, and may be slits aligned in the row direction. In the case where slits are adopted as the openings, some of the slits may be arranged complementarily at irregular intervals in the same manner in which some of the columns of the openings shown in FIG. 8 are arranged.

Figure 9:
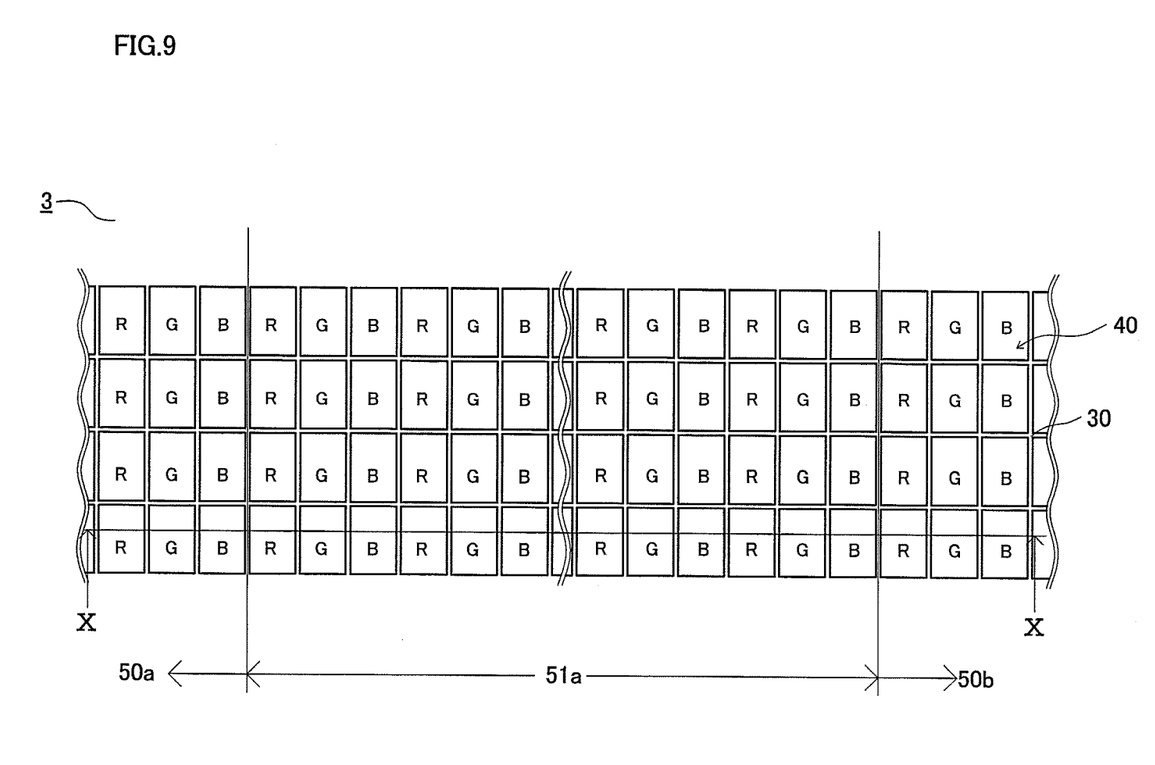
FIG. 9 is an enlarged view of a portion D in FIG. 7 of the color filter substrate according to the second embodiment of the present invention.
Figure 10:
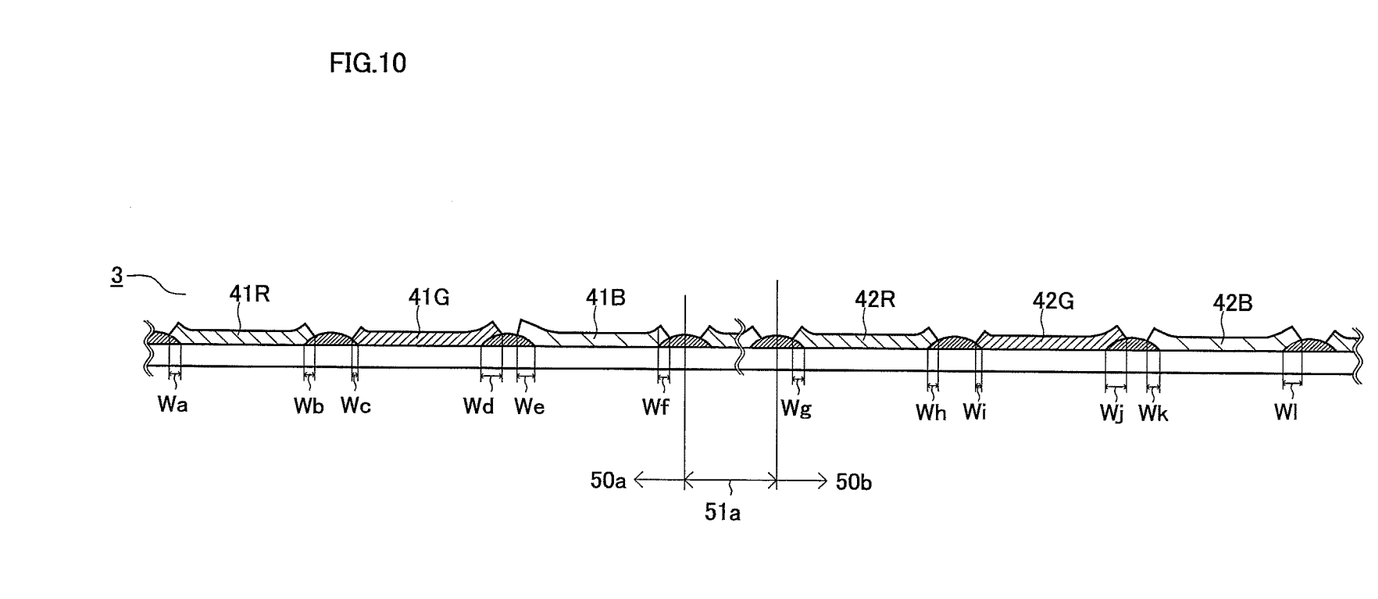
FIG. 10 is a cross-sectional view along a X-X line in FIG. 9.

FIG. 9 is an enlarged view of a D portion in FIG. 7 of the color filter substrate according to the second embodiment of the present invention. FIG. 10 is a cross-sectional view along a X-X line in FIG. 9.

Also in the color filter substrate 3 according to the present embodiment, overlap widths between colored layers of each color and the black matrix 30 in the areas 50a and 50b satisfy the same conditions as described in the first embodiment.

Referring to FIG. 10, first of all, the amounts of misalignment in the row direction between colored layers 41R of one color (e.g., red) and the black matrix 30 are constant in the area 50a exposed through the photomask 10a. Similarly, the amounts of misalignment in the row direction between green colored layers 41G and the black matrix 30 are constant, and the amounts of misalignment in the row direction between blue colored layers 41B and the black matrix 30 are constant. Therefore, overlap widths Wa to Wf between the black matrix 30 and the colored layers 41R, 41G, and 41B are also constant.

Secondly, also in the area 50b exposed through the photomask 10b and spaced from the area 50a by a plurality of columns of pixels, the amounts of misalignment in the row direction between colored layers 42R of one color (e.g., red) and the black matrix 30 are constant. Similarly, the amounts of misalignment in the row direction between green colored layers 42G and the black matrix 30 are constant, and the amounts of misalignment in the row direction between blue colored layers 42B and the black matrix 30 are constant. Therefore, overlap widths Wg to Wl between the black matrix 30 and the colored layers 42R, 42G, and 42B are also constant.

In addition to the above conditions, the following conditions are satisfied. For the colored pixels of one color (e.g., red), the overlap widths Wa (or Wb) between the colored layers 41R and the black matrix 30 in the area 50a, and the overlap widths Wg (or Wh) between the colored layers 42R and the black matrix 30 in the area 50b are set such that the maximum value of the differences between the overlap widths Wa (or Wb) and the overlap widths Wg (or Wh) is 4 µm or less. Also for the green colored pixels and blue colored pixels, the maximum values of the differences between the overlap widths between the colored layers and the black matrix 30 in the area 50a, and the overlap widths between the colored layers and the black matrix 30 in the area 50b (the maximum value of the differences between the overlap widths Wc or Wd and the overlap widths Wi or Wj, and the maximum value of the differences between the overlap widths We or Wf and the overlap widths Wk or Wl) are 4 μm or less.

Further, in the entire area of the color filter substrate 3, the maximum value of the overlap widths Wa to Wl in the row direction between the colored layers and the black matrix 30 is 8 μm or less.

Therefore, also in a liquid crystal display device using the color filter substrate 3 according to the present embodiment, occurrence of display unevenness among different areas can be effectively prevented.

In addition, since the color filter substrate 3 includes the areas that are exposed through overlapping portions between adjacent photomasks, the influence of misalignment gradually develops. For example, since the area 51a in which the amounts of misalignment vary is provided between the areas 50a and 50b, the degree of variation in the orientation of a liquid crystal gradually changes from the area 50a to the area 50b unlike in the case of the color filter substrate 1 according to the first embodiment in which the amount of misalignment abruptly changes between the area 50a and the 50b. Therefore, occurrence of display unevenness can be made less noticeable in a liquid crystal display device.

(Modification of Second Embodiment)

Figure 11:
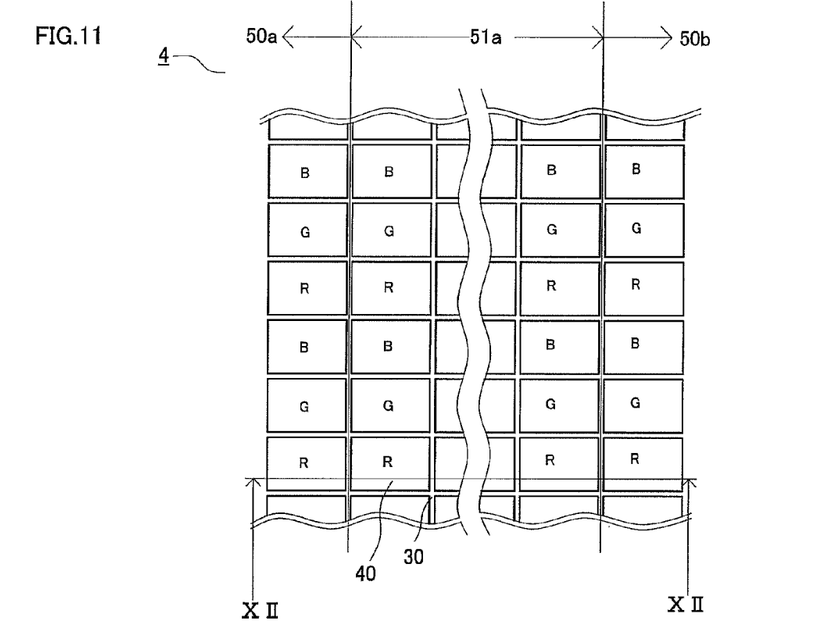
FIG. 11 is a plan view of a color filter substrate according to a modification of the second embodiment.
Figure 12:
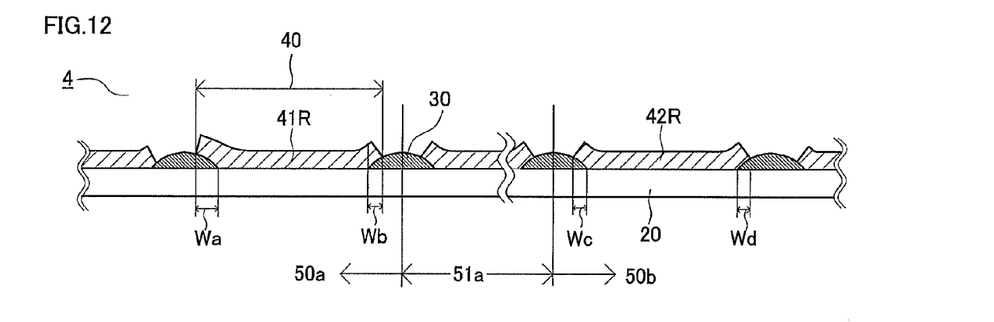
FIG. 12 is a cross-sectional view along a XII-XII line in FIG. 11.

FIG. 11 is a plan view of a color filter substrate according to another modification, and FIG. 12 is a cross-sectional view along a XII-XII line in FIG. 11.

A color filter substrate 4 according to the present embodiment is different from the color filter substrate 3 shown in FIG. 9 in that colored layers of the same color are aligned in the row direction (the leftward/rightward direction in FIG. 11). The color filter substrate 4 is produced by repeatedly performing exposure a plurality of times while transporting a substrate in the arrow direction in the figure toward photomasks arranged in the same manner as in FIG. 7 (it should be noted that the shape and arrangement of the openings are different from those in the photomasks in FIG. 7).

As shown in FIG. 11, in the color filter substrate 4, the colored pixels 40 of the same color are formed continuously from the area 50a to the area 50b which are adjacent to each other. As shown in FIG. 12, in the color filter substrate 4, the overlap widths Wa (or Wb) in the row direction between the colored layers 41R and the black matrix 30 in the area 50a, and the overlap widths Wc (or Wd) in the row direction between the colored layers 42R and the black matrix 30 in the area 50b, are set such that the maximum value of the differences between the overlap widths Wa (or Wb) and the overlap widths Wc (or Wd) is 4 μm or less. The same conditions are satisfied for the blue and green colored pixels. In addition, the maximum value of the overlap widths Wa to Wd is 8 μm or less. Also in a liquid crystal display device using the color filter substrate 4, occurrence of display unevenness among different areas can be effectively prevented.

Further, since the color filter substrate 4 also includes the areas that are exposed through overlapping portions between adjacent photomasks, the influence of misalignment gradually develops between adjacent areas. Therefore, when the color filter substrate 4 is used in a display device, occurrence of display unevenness can be prevented with enhanced effectiveness.

In the first and second embodiments described above, dot-shaped colored pixels are formed. However, the present invention is not limited thereto. For example, stripe-shaped colored pixels may be formed that extend in the substrate transportation direction.

In the first and second embodiments described above, a plurality of areas are formed on a substrate by means of twelve or fourteen photomasks. However, the present invention is not limited thereto. The present invention is applicable to any case where exposure is performed by means of two or more photomasks.

In the first and second embodiments described above, all of the widths (in the direction perpendicular to the substrate transportation direction) of the areas each exposed through a single photomask are equal. However, the present invention is not limited thereto. The widths of the areas to be exposed may be varied by, for example, using photomasks which are different from each other in the number of openings aligned in the width direction of the areas.

In the second embodiment described above, all of the widths of the overlapping portions between the photomasks in the different rows are equal. However, the present invention is not limited thereto. For example, the overlap widths between the photomasks may be varied for each overlapping portion.

In the first and second embodiments described above, a black matrix and colored pixels are provided on a color filter substrate. However, the present invention is not limited thereto. For example, the present invention may be applied to a color filter obtained by providing colored layers directly on a TFT substrate including: a plurality of thin-film transistors arranged in matrix on a substrate; a plurality of source lines extending in a row direction or a column direction; and a plurality of gate lines extending in a direction perpendicular to the source lines. In this case, overlap widths between the colored layers and the source lines or the gate lines may satisfy the conditions described above.

EXAMPLES

Hereinafter, specific examples in which the present invention was implemented will be described.

First, a black matrix pattern, a strip-shaped light shielding area around colored layer areas, a peripheral dummy pattern, and alignment marks for alignment were formed on a substrate by photolithography method using a resist in which a black pigment was dispersed.

Next, a colored resist was applied to the substrate with a precision slit coater, the colored resist containing a red pigment, a transparent resin, a monomer having ethylene unsaturated double bonds, a photopolymerization initiator, and a polymerization inhibitor, and capable of being cured by irradiation with laser having a wavelength of 340 to 380 nm.

The resist on the substrate was exposed by a small mask continuous exposure method. In the same manner as shown in FIGS. 1 and 2, six photomasks were arranged in one row, and six other photomasks were arranged in another row behind the one row in such a manner as to compensate for the spaces between the photomasks and to avoid overlap of the opening-formed areas of the photomasks between the different rows. While the substrate was being transported in the arrow direction, the resist film formed on the substrate was irradiated sequentially through stripe-shaped or dot-shaped transmission parts of the photomasks to burn stripe-shaped or dot-shaped colored layer patterns sequentially. Alignment between the photomasks and the substrate was performed by sequentially adjusting exposure positions while observing the positional relationship between the black matrix pattern on the substrate and the pattern of the photomasks in an image captured by a CCD camera. The dimension of the openings of the photomasks, the irradiation intensity of the exposure heads, and the like, were adjusted so that the amounts of misalignment between the colored pixels of the same color and the black matrix were constant in each area exposed through the corresponding one of the photomasks.

Then, developing, water-rinsing, and baking process were performed to form red colored layers. Subsequently, green and blue colored layers were also formed sequentially on the substrate through the same processes. After the formation of the colored layers was completed, an overcoat layer and a transparent electrode film (ITO) were provided to form a color filter.

Example 1

In example 1, the design value of the overlap widths of the colored layers with the black matrix was 6.5 µm. In a color filter substrate produced in example 1, the maximum value Dmax of the differences between the overlap widths of the colored layers of the same color was 1.2 µm, and the maximum value Wmax of the overlap widths of the colored layers was 7.6 µm.

(Comparative Example 1)

In comparative example 1, the design value of the overlap widths of the colored layers with the black matrix was 5.0 µm. In a color filter substrate produced in comparative example 1, the maximum value Dmax of the differences between the overlap widths of the colored layers of the same color was 4.6 µm, and the maximum value Wmax of the overlap widths of the colored layers was 7.6 µm.

(Comparative Example 2)

In comparative example 2, the design value of the overlap widths of the colored layers with the black matrix was 5.75 µm. In a color filter substrate produced in comparative example 2, the maximum value Dmax of the differences between the overlap widths of the colored layers of the same color was 4.6 µm, and the maximum value Wmax of the overlap widths of the colored layers was 8.5 µm.

(Comparative Example 3)

In comparative example 3, the design value of the overlap widths of the colored layers with the black matrix was 7.25 µm. In a color filter substrate produced in comparative example 3, the maximum value Dmax of the differences between the overlap widths of the colored layers of the same color was 1.3 µm, and the maximum value Wmax of the overlap widths of the colored layers was 13.4 µm.

(Comparative Example 4)

In comparative example 4, the design value of the overlap widths of the colored layers with the black matrix was 8.0 µm. In a color filter substrate produced in comparative example 4, the maximum value Dmax of the differences between the overlap widths of the colored layers of the same color was 4.5 µm, and the maximum value Wmax of the overlap widths of the colored layers was 12.2 µm.

An alignment film was printed on the color filter substrates according to example 1 and comparative examples 1 to 4, and on electrode substrates to be bonded to the color filter substrates, and rubbing process was performed. Then, patterning was performed on sealants, and a liquid crystal was dropped onto the substrates by ODF method. Subsequently, the color filter substrates and the electrode substrates were bonded to each other to produce TN-mode liquid crystal panels.

In a state where the produced liquid crystal panel was sandwiched between polarizing plates, and backlight was transmitted, a voltage was applied to the color filter substrate and the opposite electrode of the liquid crystal panel to drive the liquid crystal. Then, display unevenness in halftone display was visually observed. The results of the observation were evaluated as "○: No display unevenness, Δ: Slight display unevenness, or ×: Noticeable display unevenness".

TABLE 1

| Item | Present invention Example 1 | Comparative example 1 | Comparative example 2 | Comparative example 3 | Comparative example 4 |
|---|---|---|---|---|---|
| Design value of overlap width (µm) | 6.50 | 5.00 | 5.75 | 7.25 | 8.00 |
| Dmax (µm) | 1.2 | 4.6 | 4.6 | 1.3 | 4.5 |
| Wmax (µm) | 7.6 | 7.6 | 8.5 | 13.4 | 12.2 |
| Display unevenness of liquid crystal panel | ○ | Δ | Δ | × | × |

It was confirmed from table 1 that the smaller the Dmax and the Wmax are, the less the display unevenness is. Further, it was confirmed that the Dmax and the Wmax are required to be 4 µm or less and 8 µm or less, respectively, in order to prevent occurrence of visible display unevenness between areas (adjacent exposed areas) of a liquid crystal panel that are exposed through adjacent exposure heads.

INDUSTRIAL APPLICABILITY

The present invention is applicable to color filter substrates incorporated in liquid crystal display devices and organic EL display devices.

| DESCRIPTION OF THE REFERENCE CHARACTERS | |
|---|---|
| 1 to 4 | color filter substrate |
| 10 | photomask |
| 11 | opening |
| 20 | substrate |
| 30 | black matrix |
| 40 | colored pixel |
| 41, 42 | colored layer |
| 50, 51 | area |

DESCRIPTION OF THE REFERENCE CHARACTERS

1 to 4 color filter substrate
10 photomask
11 opening
20 substrate
30 black matrix
40 colored pixel
41, 42 colored layer
50, 51 area

The invention claimed is:

1. A method for manufacturing a color filter by using a plurality of photomasks smaller than the color filter, the color filter including:
   a substrate;
   a lattice-shaped black matrix formed on the substrate;
   a plurality of colored pixels arranged on the substrate in a row direction and
   a column direction perpendicular to the row direction, wherein
   colored pixels of the same color are arranged in the column direction, and each of the colored pixels includes a colored layer overlapping with an area defined by the black matrix and with a portion of the black matrix around the area, the method comprising:

performing, for each color, the processes of:
applying a resist to the substrate;
locating a first photomask so as to be opposed to a first area where a plurality of consecutive columns of the colored pixels are formed;
locating a second photomask so as to be opposed to a second area where a plurality of other consecutive columns of the colored pixels are formed and that does not overlap with the first area; and
exposing the substrate to which the resist has been applied by causing a light source to intermittently emit light while transporting the substrate toward the first photomask and the second photomask, thereby sequentially forming colored layers on the substrate to form the colored pixels; and performing at least one of the processes of:
(a) adjusting exposure illuminances of an exposure head to which the first photomask is mounted and an exposure head to which the second photomask is mounted, such that a difference between the exposure illuminances is not higher than 1%; and
(b) adjusting tilts of the first photomask and the second photomask such that a difference in distance from the substrate between the first photomask and the second photomask is not greater than 10 µm, wherein in the exposing process, exposure is performed such that the amounts of misalignment in the row direction between colored layers of the same color and the black matrix are constant in the first area, the amounts of misalignment in the row direction between colored layers of the same color and the black matrix are constant in the second area, a maximum value of differences between overlap widths in the row direction between the colored pixels of the same color and the black matrix in the first area, and overlap widths in the row direction between the colored pixels of the same color and the black matrix in the second area, is not greater than 4 µm, and a maximum value of overlap widths in the row direction between all of the colored pixels and the black matrix is not greater than 8 µm.

2. The method for manufacturing the color filter according to claim 1, further comprising:
a process of offsetting positions of the first photomask and the second photomask such that a maximum value of differences between overlap widths in the row direction between the colored pixels and the black matrix formed in the first area and overlap widths in the row direction between the colored pixels and the black matrix in the second area is not greater than 1 µm.

3. The method for manufacturing the color filter according to claim 1, wherein the second area is adjacent to the first area.

4. The method for manufacturing the color filter according to claim 1, wherein the second area is spaced from the first area by a plurality of columns of the colored pixels.

5. A method for manufacturing a color filter by using a plurality of photomasks smaller than the color filter, the color filter including:
a substrate;
a plurality of colored pixels arranged on the substrate in a row direction and a column direction perpendicular to the row direction, and
a plurality of lines extending in the row direction and the column direction, wherein
colored pixels of the same color are arranged in the column direction, and
each of the colored pixels includes a thin-film transistor provided in an area defined by the lines, and a colored layer overlapping with the thin-film transistor and with a portion of the lines around the thin-film transistor, the method comprising:

performing, for each color, the processes of:
applying a resist to the substrate;
locating a first photomask so as to be opposed to a first area where a plurality of consecutive columns of the colored pixels are formed;
locating a second photomask so as to be opposed to a second area where a plurality of other consecutive columns of the colored pixels are formed and that does not overlap with the first area; and
exposing the substrate to which the resist has been applied by causing a light source to intermittently emit light while transporting the substrate toward the first photomask and the second photomask, thereby sequentially forming colored layers on the substrate to form the colored pixels; and performing at least one of the processes of:
(a) adjusting exposure illuminances of an exposure head to which the first photomask is mounted and an exposure head to which the second photomask is mounted, such that a difference between the exposure illuminances is not higher than 1%; and
(b) adjusting tilts of the first photomask and the second photomask such that a difference in distance from the substrate between the first photomask and the second photomask is not greater than 10 µm, wherein in the exposing process, exposure is performed such that the amounts of misalignment in the row direction between colored layers of the same color and the lines are constant in the first area,
the amounts of misalignment in the row direction between colored layers of the same color and the lines are constant in the second area,
a maximum value of differences between overlap widths in the row direction between the colored pixels of the same color and the lines in the first area, and overlap widths in the row direction between the colored pixels of the same color and the lines in the second area, is not greater than 4 µm, and
a maximum value of overlap widths in the row direction between all of the colored pixels and the lines is not greater than 8 µm.

6. The method for manufacturing the color filter according to claim 5, further comprising:
a process of offsetting positions of the first photomask and the second photomask such that a maximum value of differences between overlap widths in the row direction between the colored pixels and the lines formed in the first area and overlap widths in the row direction between the colored pixels and the lines in the second area is not greater than 1 µm.

7. The method for manufacturing the color filter according to claim 5, wherein the second area is adjacent to the first area.

8. The method for manufacturing the color filter according to claim 5, wherein the second area is spaced from the first area by a plurality of columns of the colored pixels.

* * * * *